ively. The unfolding joint includes two joint sections which are tiltably connected to each other and are tilting axis of the joint carries a rotatably mounted cable pulley. Two spring biased locking members are mounted in the joint section that is connected to the outer panel. Stop surfaces are provided in the second joint section and in the cable pulley for cooperation with the locking members. In the partially unfolded state both locking members cooperate to provide a formlocking of the unfolding joint. In the fully unfolded state the locking is accomplished by only one of the locking elements in the form of a locking lever. During the transition from the partially unfolded state into the fully unfolded state the other locking member in the form of a locking bolt provides a formlocking connection of the outer or second joint half with the cable pulley for the closed loop cable control.

United States Patent [19]
Roth et al.

[11] Patent Number: 4,880,188
[45] Date of Patent: Nov. 14, 1989

[54] JOINT FOR UNFOLDING PANELS OF A SOLAR COLLECTOR

[75] Inventors: Martin Roth, Taufkirchen; Helmut Kiendl, Munich, both of Fed. Rep. of Germany

[73] Assignee: Messerschmitt-Boelkow-Blohm GmbH, Munich, Fed. Rep. of Germany

[21] Appl. No.: 306,812

[22] Filed: Feb. 3, 1989

[30] Foreign Application Priority Data

Feb. 11, 1988 [DE] Fed. Rep. of Germany ....... 3804202

[51] Int. Cl.⁴ .............................................. B64G 1/46
[52] U.S. Cl. .................................................. 244/173
[58] Field of Search ............... 244/158 R, 173; 52/70, 52/71, 108, 113, 114, 121, DIG. 4; 160/188, 193, 213, 029, 206, 183

[56] References Cited

U.S. PATENT DOCUMENTS

3,525,483  8/1970  Van Alstyne ...................... 244/173
4,747,566  5/1988  Kiendl .

FOREIGN PATENT DOCUMENTS

3215434 10/1983  Fed. Rep. of Germany .
3615264 11/1983  Fed. Rep. of Germany .

OTHER PUBLICATIONS

Aircraft Engineering: Jan. 1984; pp. 2 to 5; by H. Kellermeier, K. Schneider, MBB GmbH, Space Division, Ottobrunn, Germany; article entitled: "The Retractable Ultra-lightweight (ULP) solar Array for Retrievable Space Platforms".

Primary Examiner—Galen L. Barefoot
Attorney, Agent, or Firm—W. G. Fasse; D. H. Kane, Jr.

[57] ABSTRACT

An unfolding joint for the panels of a solar generator is constructed for the partial and complete unfolding of the outer solar panel of the solar generator which is connected to the body of a spacecraft. The solar generator includes, in addition to the outer panel a pluraLity of inner panels. The unfolding is controlled by a closed cable loop in a positive manner, whereby primary and secondary hold down devices are provided for the outer panel and for the inner panels respect 12 Claims, 1 Drawing Sheet

JOINT FOR UNFOLDING PANELS OF A SOLAR COLLECTOR

FIELD OF THE INVENTION

A joint for unfolding sections or panels of a solar collector is constructed to permit a two-step unfolding. The first step results in a partial unfolding and the second step unfolds the solar panel sections completely. The solar panels include an outer panel and several inner panels which are mounted to a spacecraft or the like.

BACKGROUND INFORMATION

The panels or panel sections of solar collectors or generators carried by spacecraft are interconnected by articulated joints, so that the unfolding is controllable by cables in a so-called closed cable loop arrangement. The outer panel is held in a folded state by a primary hold-down device prior to any unfolding. The other inwardly located panel sections are held down by at least one secondary hold-down device, as long as the outer panel has been partially unfolded. An articulated joint used in such a structure comprises a first joint section or joint half connected to the outer panel and a second joint section or joint half connected to the nearest inward or neighboring inner panel. The two joint sections are hinged to each other by a shaft pulley is mounted on the outer joint half. Due to the limited space and due to strength considerations it is customary to fold the panels of solar generators for spacecraft into a package prior to their actual use. As mentioned, at least one hold-down device is effective on the outer panel to keep the solar generator folded in a package. In outer space it is frequently necessary or rather sufficient that initially only a portion of the maximally producible solar energy is available. In such a case, it is customary to first unfold only the outer panel by about 90°, so that it is partially unfolded for facing the sun. Once the solar generator is required to produce its full output, the outer panel is unfolded completely by another 90°, while the inner panels, which up to this point did not participate in the generation of energy, are completely unfolded relative to each other in a single step by tilting through about 180°. To enforce the synchronisation of the panel motions, with the exception of the partially foldable outer panel, frequently the principle of the closed cable loop is used. Such a closed cable loop functions substantially as a form locked gear drive, provided there is enough friction between the pulleys and the cable. Such a closed cable loop unfolding drive is, for example, used in the solar generator described in the article "The retractable ultralightweight (ULP) solar array for retrievable space platforms" in the magazine "Aircraft Engineering" Jan. 1984, pages 2 to 5. In this known generator further cables are used for driving the panels. German Patent Publication (DE-OS 3,615,264) corresponding to U.S. Pat. No 4,747,566 (Kiendl) describes a mechanism for partially and completely unfolding a solar generator wing. This known mechanism is structurally especially simple, since the mechanism itself does not need any movable parts for its unfolding. The known device includes primary and secondary holddown devices, which are independent of one another and which enable the selective release of the outer and inner wing sections or panels, respectively. For example, the innermost panel of the outer wing section is unfolded in response to biased springs.

In its partially unfolded condition this innermost panel of the outer wing sections rests with one side against a mechanical stop. When the secondary hold-down devices are released or opened, that is, when the inner wing section is being unfolded, the already partially unfolded panel clears the mechanical stop, so that it can unfold completely. The panel rests against a further stop in the fully unfolded condition. It is a drawback of the known solar generator, that due to the unfolding in response to elastic power storing means, such as springs, the motions of the outer wing section are not definitely controlled during the partial and complete unfolding. Further, the movement against a mechanical stop on one side only causes at least one, possibly several rebounds of the outer wing section until it stops in the desired position. Such rebounds may cause rather critical loads and respective stresses in the entire generator structure. Even if the spacecraft or satellite performs corrective motions, such motions can cause undesired tilting of the outer wing section or panel section. German Patent Publication (DE-PS) 3,215,434 describes a locking mechanism which provides a form locking connection between neighboring panels in the completely unfolded condition, whereby the rebounding is prevented. The locking element is a springbiased lever or a bending spring. A stepwise unfolding is not possible with this known mechanism, because once locked, the mechanism cannot be unlocked without additional operating means.

OBJECTS OF THE INVENTION

In view of the above, it is the aim of the invention to achieve the following objects singly or in combination:

to construct a joint for the partial and complete unfolding of the outer panel of a solar generator comprising several panels, whereby the above mentioned rebounding or bouncing can be avoided;

the unfolding joint shall assure a safe and certain form-locking for the partially unfolded state and for the fully unfolded state in both directions of panel tilting; and the unfolding joint shall be capable of causing a coupling of the outer panel to the closed cable loop control during the transition from the partially unfolded state into the fully unfolded state.

SUMMARY OF THE INVENTION

The solar panel joint according to the invention is characterized by the following features. Two locking elements, namely a locking lever and a locking bolt are mounted or supported in the first joint half. These elements are either spring biased or have an inherent spring characteristic. The second joint half or section comprises several stop surfaces or members. One stop surface or member faces a respective stop portion, such as a bolt, of the first locking element when the panel is in a partially unfolded state. Specifically, said one stop surface is positioned to face the backside of the respective stop portion or bolt, thereby forming a so-called rebound arrester. Two further stop surfaces of said second joint half or section hold the stop portion or bolt in a form-locking manner, when the panel is completely unfolded. A further stop surface, such as a bore, locks the second locking element against further unfolding, when the panel is in the partially unfolded state. The second joint half or section has a surface, which holds the second locking element in an ineffective position until the partially unfolded state of the panel is reached. The cable pulley has a stop surface for the second locking element or locking bolt which is effective in the partially unfolded state. The cable pulley further has a recess or bore engaging the second locking element or locking bolt which is effective in the partially unfolded state. The cable pulley has a further recess or bore into which the second locking element or locking bolt is received during the transition from the partially unfolded state to the fully unfolded state. The bolt is also received in the further recess after the fully unfolded state has been attained. The diameter ratio of the pulley (4) to another interconnected cable pulley (not shown) is such that the full unfolding of the inner panels through an angle of 180° causes an angular rotation (x) of the pulley (4) which is larger by a lead angle ($\alpha$) than the rotational angle through which the outer panel passes from its partially unfolded state into its fully unfolded state. The angle x is about 90°, $\alpha$ is about 20°.

In the structure according to the invention, the unfolding joint cooperates with two locking elements that are independent of one another. One locking element primarily functions for locking the panels in the fully unfolded state. The other locking element functions primarily for coupling with the closed cable loop. In the partially unfolded state both locking elements cooperate with each other so that one locking element stops a panel motion in one direction while the other locking element stops a panel motion in the opposite direction.

BRIEF DESCRIPTION OF THE DRAWINGS

In order that the invention may be clearly understood, it will now be described, by way of example, with reference to the accompanying drawings, wherein.

DETAILED DESCRIPTION OF A PREFERRED EXAMPLE EMBODIMENT AND OF THE BEST MODE OF THE INVENTION

Figure 1:
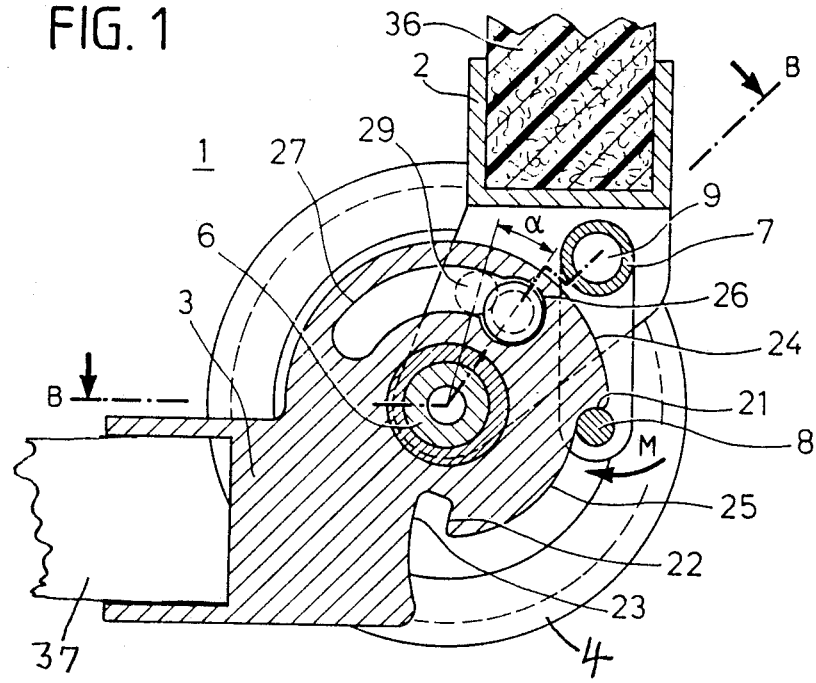
FIG. 1 is a sectional view through the unfolding joint according to the invention, whereby the sectional plane extends perpendicularly to the joint axis passing through the pivot or ball joint connecting the two joint halves or joint sections.
Figure 2:
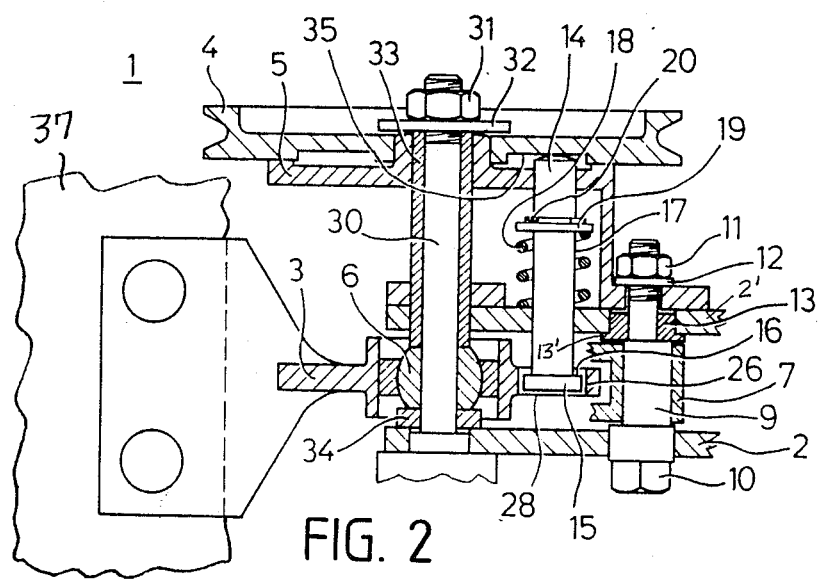
FIG. 2 is a sectional view along section line B—B in FIG. 1.

The joint halves or sections 2 and 3 of the joint 1 shown in FIGS. 1 and 2 are connected to each other by a ball or pivot joint 6 providing three degrees of freedom, namely rotational movements around each of the three axes of an orthogonal coordinate system. The panel 36 is the outermost panel. A further panels which is inwardly located in the package after the folding is completed, are shown at 37. In order to provide a defined swiveling axis between the panel 36 and the next neighboring inner panel, it is necessary to arrange at least one ball and socket joint with an axial spacing from the shown unfolding joint 1. Such ball and socket joint does not require any locking mechanism, nor does it need any cable control. Using ball and socket joints has the advantage that undesirable force components can be avoided. Such force components can be caused by manufacturing and assembly errors, by deformations of the panel components, and so forth. Avoidance of such undesirable force components is especially effective if one fixed bearing and one movable bearing are used in combination.

FIGS. 1 and 2 show the unfolding joint in the partially unfolded state of the outer panel 36, whereby the two joint sections 2, 3 or the panels 36,37 enclose an angle which is approximately a right angle, please see FIG. 1. In order to reach the partially unfolded shown state, it is necessary that the outer panel 36 which initially rests flat on the inner panels, is released by the primary hold down device not shown. When these devices are released, elastically effective power storage means, such as springs or motor generated power, is used to move the outer panel 36 into the partially unfolded state. Preferably, the unfolding, or rather the partial unfolding, is accomplished by means of springs located in the joints, for example, in the unfolding joint 1. For simplicity's sake the illustration does not show these conventional springs. The closed loop cable control does not yet become effective in this partially unfolding action.

The locking in the partially unfolded state is accomplished according to the invention by means of two elements, namely the locking lever 7 and the locking bolt 14. The locking lever 7 is tiltable about an axis constructed as an eccentric bolt 9 to provide the desired adjustability. An adjustment is accomplished by rotating the eccentric bolt 9 relative to the joint section 2 by means of the square head 10. When the correct position has been adjusted in which the locking is free of play, the eccenter bolt 9 is rigidly secured against the joint half 2 by tightening the nut 11 pressing against the section 2 through the washer 12. By using the same bore diameters the manufacturing can be facilitated. Therefore, the small diameter end of the bolt 9 is mounted in a bearing bushing 13 having a stop shoulder 13' resting against a wall 2' of the joint section 2. The locking lever 7 comprises an operating element in the form of a cylindric stud 8 biased by a spring not shown in the direction toward the joint axis. The spring bias is symbolically illustrated in FIG. 1 by the arrow M representing a moment. The locking bolt 14 comprises a head 15 with a stop shoulder 16 and a shaft 17 having a diameter smaller than the diameter of the head 15. A spring 18 biases the locking bolt 14 toward the cable pulley 4. For this purpose the bolt 14 is axially displaceably mounted in the joint section 2 and in the pulley carrier 5 which is rigidly connected to the joint section 2. The biasing spring 18 bears against a washer 19 held in place on the shaft 17 by a safety or snap ring 20.

In the completely folded state of the panels, and during the transition into the partially unfolded state, the locking bolt 14 is in an ineffective position, whereby the free end of the bolt 14, or rather of the bolt shaft 17, moves in an elongated hole 27 in the second joint half or section 3. The head 15 of the locking bolt 14 is retained at its stop shoulder 16 and the head 15 slides on the surface 28 on both sides of the elongated hole 27. The spring 18 is thereby maximally compressed to exert the maximum biasing force. When the partially unfolded state is reached, the bolt head 15 falls into the bore 26 of the joint section 3 and the crowned end of the shaft 17 bears against the stop surface 35 of the cable pulley 4. Thus, the bolt head 15, cooperating with the bore 26 by resting against one side of the bore, prevents a further unfolding. The stud 8 of the locking lever 7 slides along the cylindrical sliding track 24 during the transition from the folded into the partially unfolded state, whereby the stud 8 comes to rest in front of the stop surface 21 formed as a step in the slide track 24. In this manner a bouncing of the section joint half 2 and hence of the outer panel 36 is prevented because the just described mechanism including the stud 8 function as a bounce preventing lock. The elements 8, 21, 15, and 26 thus form a locking mechanism which is effective in both tilting directions. This locking mechanism can be adjusted by means of the eccentric bolt 9 to be free of any play.

The secondary hold down device or devices must be released for the further unfolding of the inner panels which are still folded in the partially unfolded state of the outer panel. A drive mechanism is provided for releasing the hold down device or devices. As a result, the closed loop cable control is activated. The outermost element of the closed loop cable control is the cable pulley 4 rotatably mounted on the pulley carrier 5 which simultaneously forms a one-sided axial stop. The respective counter stop is formed by the disk 32. The cable pulley mounting including the joint section 2 and the ball of the ball and socket joint 6 forms a rigid unit including the axial bolt 30, the spacer bushing 33, the spacer washer 34, the nut 31, and the screw action of the eccentric bolt 9.

For unfolding the inner panels, the cable pulley 4 is rotated relative to the partially unfolded joint 1 by the lead angle until the bore 29 in the cable disk 4 comes into alignment with the shaft 17 of the locking bolt 14. At this time the spring 18 is still biased, whereby the shaft 17 is pushed into the slightly larger bore 29, and whereby the bolt head 15 is released from the bore 26 in the second joint section 3. As a result, the joint half 2 is locked to the cable pulley 4 in a formlocking manner, so that the complete unfolding of the outer panel 36 takes place in a manner controlled by the cable control. The stud 8 of the locking lever 7 slides along the cylindrical slide track 25 and drops in the fully unfolded state under the bias of its spring between the two stop surfaces 22 and 23. As a result, the unfolding joint 1 is fully locked in a formlocking manner when the panels are completely unfolded and stretched out.

The effective diameter of the cable pulley 4 is selected with reference to the diameter of a cooperating pulley secured to an inner panel in such a way that the relative complete unfolding of the panel through an angle of about 180° requires an angular movement x of the cable pulley 4 of about 90° plus the lead angle $\alpha$. The lead angle $\alpha$ can, for example, correspond to about 20°. The angle of about 90° through which the cable pulley 4 must move is the angle of panel movement from the partially unfolded state to the fully unfolded state.

Although the invention has been described with reference to specific example embodiments it will be appreciated that it is intended to cover all modifications and equivalents within the scope of the appended claims.

What we claim is:

1. A joint for interconnecting in an unfoldable manner panels (36, 37) of a solar collector having at least one outermost panel (36) and at least one inner panel (37), comprising a first joint section (2 rigidly connected to said outermost panel, a second joint section rigidly connected to said inner panel, journal means including a journal shaft (30) for journalling said first and second joint sections to each other for permitting an unfolding movement of the first and second joint sections relative to each other, a cable pulley (4) operatively mounted on said journal shaft, first spring biased locking means (7) and second spring biased locking means (14) mounted in said first joint section (2) for arresting said first and second joint sections, said second joint section (3) having a plurality of stop means (21, 22, 23, 26) arranged for cooperation with the respective locking means mounted in said first joint section (2) for holding said first locking means in a formlocking manner in the fully unfolded state and for blocking said second locking means in the unfolding direction in a partially unfolded state, said second joint section (3) having means (28) for keeping said second locking means (14) in an ineffective position until said outer panel (36) has been tilted into a partially unfolded state, said cable pulley (4) having a stop surface (35) for cooperation with said second locking means when said outer panel is in a partially unfolded state, said cable pulley (4) further having recess means (29) for receiving said second locking means (14) in a formlocking manner during transition from a partially unfolded state into a fully unfolded state and in the fully unfolded state, said cable pulley (4) having such a diameter that the full unfolding of said inner panel through 180° causes said cable pulley (4) to move through angular range (x) that corresponds to an angular tilting movement of said outer panel plus a lead angle ($\alpha$), whereby panel rebounding is prevented.

2. The joint of claim 1, wherein said plurality of stop means comprise a first stop surface (21) positioned to face a backside of a locking member (8) forming said first locking means (7) for forming a rebound arrester.

3. The joint of claim 2, wherein said plurality of stop means comprise two further stop surfaces (22, 23) for holding said locking member (8) in a formlocking manner in the fully unfolded state.

4. The joint of claim 3, wherein said plurality of stop means comprise a bore (26), said second locking means comprising a locking bolt (14) arranged for cooperation with said bore (26) for blocking said locking bolt (14) in the unfolding direction in said partially unfolded state.

5. The joint of claim 1, wherein said first locking means comprise a tiltable bolt (9) mounted in said first joint section (2) and a locking lever (7) mounted on said tiltable bolt (9), said tiltable bolt (9) having a tilting axis extending in parallel to said journal shaft (30), and a cylindric locking stud (8) mounted to said locking lever (7) and thus to said tiltable bolt (9), said cylindric locking stud (8) engaging respective ones of said plurality of stop means (21, 22, 23), and first spring biasing means (M) for biasing said locking lever (7) with a torque moment toward said journal shaft (30), thereby urging said cylindric locking stud (8) into engagement with said respective stop means.

6. The joint of claim 1, wherein said second locking means (14) comprise a second locking bolt (17) having a bolt head (15) forming a stop shoulder (16) and a stop end arranged for cooperation with said cable pulley (4), said second locking bolt (14) extending in parallel to said journal shaft (30), and second spring means (18) for axially biasing said second locking bolt (17 toward said cable pulley (4).

7. The joint of claim 5, wherein said second joint section (3) comprises a disk portion, wherein said plurality of stop means are formed, said stop means including stop surfaces (21, 22, 23) extending axially and approximately radially in said disk for engaging said cylindric locking stud (8), first by one stop surface (21) in a partially unfolded state and then by two stop surfaces (22, 23) in the fully unfolded state, said stop surfaces having a contour adapted to a tilting motion of said cylindric locking stud (8), said disk of said second joint section having cylindrical cam surfaces (24, 25) on its circumference upstream of said one surface (21) and between said one stop surface (21) and said two stop surfaces (22, 23), said cylindric locking stud running along said cam surfaces when travelling toward said stop surfaces.

8. The joint of claim 6, wherein said stop means of said second joint section comprise a bore (26) having a diameter slightly larger than a diameter of said bolt head (15) reaching into said bore for blocking said second locking bolt (14) in the unfolding direction.

9. The joint of claim 8, further comprising an elongated hole (27) in said second joint section (3), said second locking bolt (17) moving in said elongated hole during partial unfolding, said bore (26) being located at one end of said elongated hole (27).

10. The joint of claim 1, wherein said recess (29) in said cable pulley is a bore for receiving a locking bolt (17) of said second locking means, said bore having a diameter slightly larger than a diameter of said locking bolt.

11. The joint of claim 5, wherein said tiltable bolt (9) forming a journal axis for said locking lever (7) is an eccentric bolt which is rotatable relative to said first joint section for adjusting a spacing between said journal axis and said journal shaft (30) to avoid play between said locking means and said stop means, said eccentric bolt having a tool engageable head (10) at one end and a threaded end with a nut (11) at the other end thereof.

12. The joint of claim 1, further comprising a ball and socket type connection between said first and second joint sections, said ball of said ball and socket type connection being mounted on said journal shaft.

* * * * *